(12) United States Patent
Ackerson et al.

(10) Patent No.: US 8,106,765 B1
(45) Date of Patent: Jan. 31, 2012

(54) ELECTRICAL POWER SOURCE CONNECTION WITH FAULT SAFEGUARDS

(76) Inventors: George Lee Ackerson, Ben Lomond, CA (US); Andrew Buck-Anderson, Ben Lomond, CA (US)

( * ) Notice: Subject to any disclaimer, the term of this patent is extended or adjusted under 35 U.S.C. 154(b) by 647 days.

(21) Appl. No.: 12/332,308

(22) Filed: Dec. 10, 2008

Related U.S. Application Data

(60) Provisional application No. 61/012,549, filed on Dec. 10, 2007.

(51) Int. Cl.
*G08B 1/08* (2006.01)
(52) U.S. Cl. ........ 340/538; 340/657; 340/662; 340/7.36
(58) Field of Classification Search .................. 340/538, 340/657, 661, 662, 663, 636.17, 652, 5.1, 340/7.32, 7.33, 7.36
See application file for complete search history.

(56) References Cited

U.S. PATENT DOCUMENTS

| | | | | |
|---|---|---|---|---|
| 4,864,287 A | * | 9/1989 | Kierstead | 340/648 |
| 4,996,646 A | * | 2/1991 | Farrington | 700/293 |
| 5,961,683 A | * | 10/1999 | Mizuta et al. | 65/386 |
| 2008/0255782 A1 | * | 10/2008 | Bilac et al. | 702/62 |

* cited by examiner

*Primary Examiner* — Toan N Pham

(57) ABSTRACT

Means for connecting a local electrical power source to the wiring of a building wiring. A branch circuit monitor module can be installed as part of a branch circuit that includes a circuit breaker and a power receptacle and having safe operating ranges for current and voltage carried by the branch circuit. The branch circuit monitor module can measure data representative of one or more of voltage, current, and current flow direction in the branch circuit between the circuit breaker and the power receptacle and outputs the data. A communications and control module can receive the data and in response presents control commands to a local power source, the control commands causing the local power source to modify its power output such that the branch circuit stays within the safe operating ranges. Related systems, apparatus, methods, and/or articles are also described.

20 Claims, 8 Drawing Sheets

ELECTRICAL POWER SOURCE CONNECTION WITH FAULT SAFEGUARDS

CROSS-REFERENCE TO RELATED APPLICATION

This application claims the benefit of U.S. provisional patent application Ser. No. 61/012,549, filed on Dec. 10, 2007 and entitled, "Systems and Methods for Connecting Solar Inverters with Safeguards against Faults" which is incorporated by reference herein in its entirety.

FIELD

The subject matter described herein relates to connecting an electrical power source to an electrical system with safeguards against electrical faults and circuit overloads.

BACKGROUND

Integration of electrical power inputs from local power generation sources, such as for example solar panels, batteries, wind turbines, geothermal generators, combustion-based generators, and the like, with existing installed wiring systems can be an expensive and time consuming process. For example, in a typical solar power generation installation, an inverter is supplied with direct current (DC) from a solar panel or solar panel array. The inverter converts the DC power to alternating current (AC) that can be supplied to existing wiring. The inverter is typically wired with a DC cutoff switch to permit a user to electrically isolate the DC voltage sources from the DC input of the inverter. The inverter output is also typically connected to an AC cutoff switch to permit a user to electrically isolate the AC output from the building wiring or AC mains circuit breaker panel. The DC and the AC wiring and cutoff switches are generally permanently installed and require re-engineering the installation to alter the system.

SUMMARY

The current subject matter provides, among other potentially beneficial features, improved systems and methods for connecting inverters to building wiring that enables current monitoring, communication with inverters, and fault safeguards, while being easy to assemble and disassemble.

In one aspect, a system includes a branch circuit monitor module configured to be installed as part of a branch circuit. The branch circuit includes a circuit breaker and a power receptacle and having safe operating ranges for current and voltage carried by the branch circuit. The branch circuit monitor module measures data representative of one or more of voltage, current, and current flow direction in the branch circuit between the circuit breaker and the power receptacle and outputs the data. The system also includes a communications and control module that receives the data and, in response, presents control commands to a local power source. The control commands cause the local power source to modify its power output such that the branch circuit stays within the safe operating ranges.

In a second interrelated aspect, a system includes a branch circuit that includes a circuit breaker and a power receptacle and that has safe operating ranges for current and voltage carried by the branch circuit. The system also includes a branch circuit monitor module installed on the branch circuit. The branch circuit monitor module measures data representative of one or more of voltage, current, and current flow direction in the branch circuit between the circuit breaker and the power receptacle and outputs the data. A local power source includes a network interface circuit and generates an output of alternating current electrical power, and a communications and control module receives the data and the output of alternating current electrical power. The communications and control module presents control commands to the network interface circuit in response to the data. The control commands cause the local power source to modify its power output such that the branch circuit stays within the safe operating ranges.

In a third interrelated aspect, a system includes a solar panel that produces direct current electrical power when exposed to solar radiation and a solar inverter that receives the direct current electrical power. The solar inverter includes a DC-to-AC circuit that converts the direct current electrical power to alternating current electrical power and further includes a network interface circuit. A branch circuit monitor module installs on a branch circuit of a building electrical system. The branch circuit includes a circuit breaker and a power receptacle and having safe operating ranges for current and voltage carried by the branch circuit. The branch circuit monitor module measures data representative of one or more of voltage, current, and current flow direction in the branch circuit between the circuit breaker and the power receptacle and outputs the data. A communications and control module receives the data and also receives the alternating current electrical power from the solar inverter via an electrical wire. The communications and control module also includes an electrical connector that connects to the power receptacle of the branch circuit. The communications and control module presents control commands to the network interface circuit in response to the data. The control commands cause the solar inverter to modify its power output such that the branch circuit stays within the safe operating ranges.

In a fourth interrelated aspect, a method includes receiving data at a communications and control module from a branch circuit monitor module installed on a branch circuit that comprises a circuit breaker and a power receptacle. The data represents one or more of voltage, current, and current flow direction in the branch circuit. A local power source is connected to the branch circuit at the power receptacle. The method also includes presenting control commands to a network interface circuit on the local power source in response to the data. The control commands cause the local power source to modify its power output such that the branch circuit stays within a safe operating range for the branch circuit.

In a fifth interrelated aspect, a method includes detecting, at a communications and control module, that a local power source is ready to supply electrical power. The local power source is connected to the communications and control module by an electrical wire. The communications and control module is connected to a branch circuit of a building at a power receptacle on the branch circuit. The branch circuit includes the power receptacle and a circuit breaker in a breaker panel. The method further includes establishing a first communications link between the communications and control module and a branch circuit monitor module that is installed on the branch circuit, establishing a second communications link between the communications and control module and the local power source, and completing a power circuit in the communications and control module to connect the local power source to the branch circuit. The completing occurs after the first and the second communications links are established.

In optional variations that are within the scope of the current subject matter, one or more of the following features can be included. A network interface circuit that receives and implements the control commands can be provided for installation in the local power source. Network cables can carry signals between the network interface circuit and the communications and control module. The branch circuit monitor module can further include a first wireless transceiver via which it outputs the data, and the communications and control module can further include a second wireless transceiver via which it receives the data. The branch circuit monitor module can output the data over the branch circuit using a communications over power lines protocol. A system or method can include a master inverter that includes the communications and control module and that further includes a DC-to-AC circuit that converts DC power received by the master inverter to AC power output by the master inverter. The branch circuit monitor module can include a clamshell device that is installed over an exterior insulation of a hot lead of the branch circuit without requiring disconnection of the branch circuit. The circuit breaker can include an intelligent circuit breaker that comprises the branch circuit monitor module. The local power source can include a solar panel that provides DC electrical power to an inverter that converts the DC electrical power to AC electrical power. The communications and control module can receive an output of alternating current electrical power from the local power source via an electrical wire, and the system can further include an electrical connector that carries electrical power from the communications and control module to the branch circuit. The connector can include a plug that is compatible with and that plugs in to the power receptacle and/or a connection to the power receptacle that requires a tool to attach and detach.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed embodiments. In the drawings.

DETAILED DESCRIPTION

Figure 1:
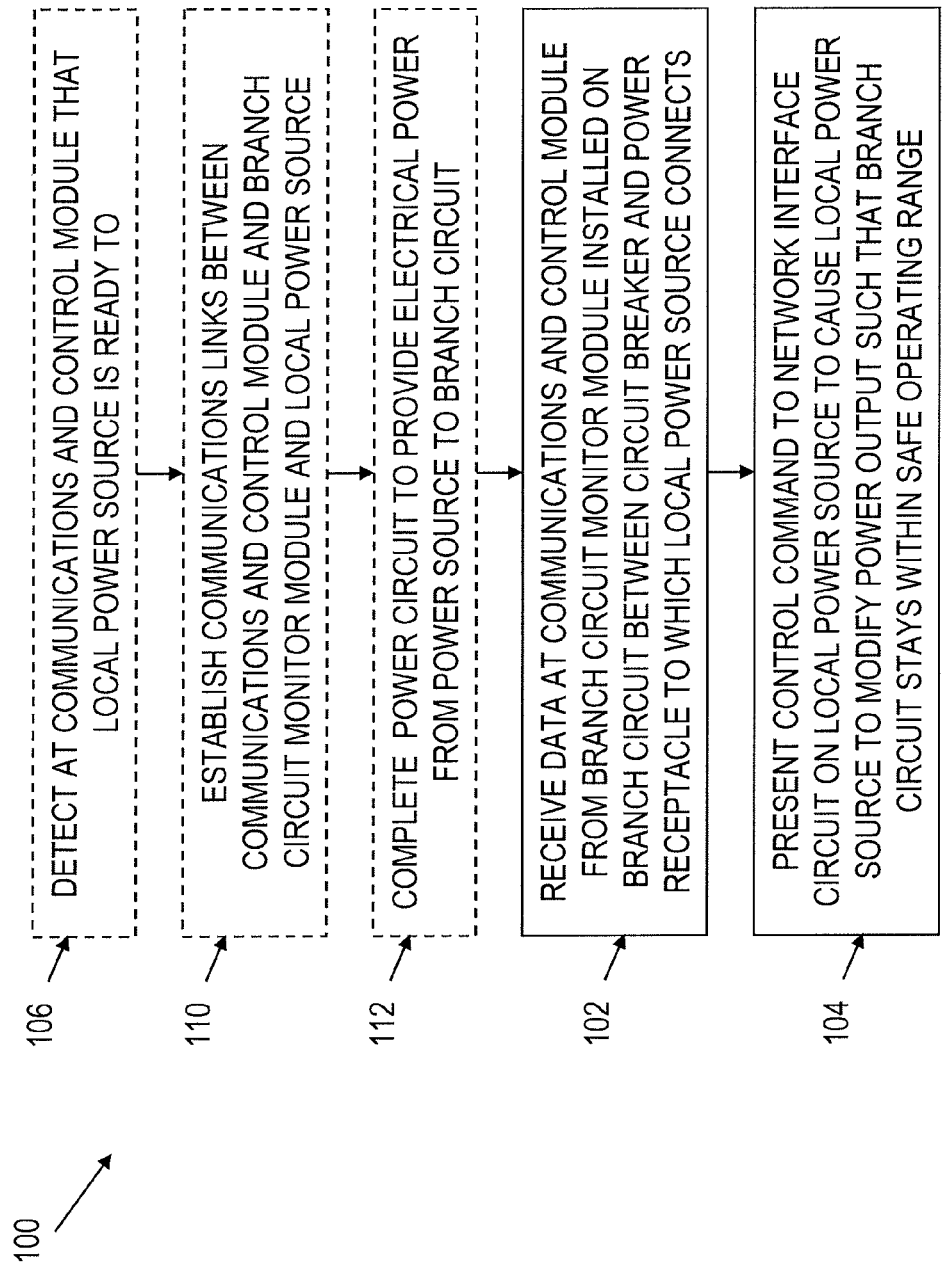
FIG. 1 is a process flow diagram illustrating a method for controlling a local power source supplying electrical power to an installed wiring system.

It can be desirable to plug a solar inverter or other local source of electrical power generation directly into the structural wiring of a residential, commercial, or other building so that the local source can augment or replace electrical power supplied from the electrical grid, or in some cases even provide power back to the grid. Local power generation sources can include solar panels, batteries, geothermal power converters, windmills and other similar devices for converting wind energy to electricity, water turbine, combustion-based generators, and the like. Current technology facilitates integration of such local sources to provide power to a structure or other permanent installation through creation of a dedicated electrical circuit from the local source to the main electrical distribution box for the permanent installation.

A homeowner or business person who wishes to add solar panels to his or her building is typically faced with a $9.00 to $10.00 per watt installed cost, with nearly 40% of the cost attributed to the labor and materials of installation. The current subject matter can enable a user to install one or more solar panels with integrated inverters, for example, by simply bolting the panel to a bracket attached to a deck railing or a bracket on the side of the building, and plugging the wiring directly into a convenient AC receptacle. No conduit, junction boxes, raceways, wire splicing and cutting or soldering may be needed, thereby eliminating much of the cost of an installation. As the installation may not be hard-wired with conduit, it may be easily moved or disconnected in a matter of minutes.

As an example, in one currently available system, a solar inverter, connected to a solar photovoltaic array, may plug directly into a residential AC plug and provide supplemental energy. U.S. Pat. No. 5,898,585, which is incorporated by reference in its entirety herein, describes some aspects of such a system. Although such inverters may provide the flexibility of using the inverter circuit with any number of solar cell panels, it fails to address the problem of permanently installed wiring and components that may be difficult to alter. Although the inverter itself may plug into an outlet, the rest of the solar panel arrangements may still be costly and labor-intensive to install and modify. Additionally, even though the inverter may have switching devices and controllers, it does not provide a system of individual communication and fault detection and control between inverters.

Another currently available system allows a user to insert a coupler and a plug from an AC module into an outlet to supply power to a load. U.S. Pat. No. 6,713,890, which is incorporated by reference in its entirety herein, describes some aspects of such a system. Upon the occurrence of an abnormal condition or fault, the coupler and plug of the AC module may separate from one another. However, although this system enables a detection of fault for one module, it fails to determine an individual inverter's fault when there is a plurality of inverters and to relay information to the inverters. Also, while the module itself may be easily plugged into the outlet, it fails to address how multiple modules could connect to one another, and whether such an arrangement would require permanently fixed parts.

In various implementations, the current subject matter provides methods, systems, techniques, apparatuses, and articles of manufacture that facilitate connection of a power source to the existing wiring of a structure or other permanent electrical system. Features of the current subject matter can include monitoring and/or limiting current flow through a branch circuit and communication of current flow information for a branch circuit to a device located near a central breaker box that can interrupt current flow through the circuit if a threshold current is exceeded on the branch circuit. In this manner, the current subject matter can enable connection of a local electrical power source, such as for example a solar inverter, to a permanent wiring installation merely by plugging into a standard power outlet that is part of the permanent wiring installation.

As noted above, the current subject matter is compatible with any kind of local electrical power source. Discussion of solar panels and solar inverters in the following descriptions should not be interpreted to limit the scope of the current subject matter. Though implementations of the current subject matter are described for use with a grid-tied inverter (solar panel and inverter synchronizing with the utility grid and providing power to the utility grid) the current subject matter can also apply to off-grid applications (solar panels and inverters, which are the primary sources of power to a building, where the utility grid is not attached to the building wiring). The source of DC power is not limited to solar panels and could work equally well if the DC source was wind power, batteries, a combustion-based generator, or other sources of DC.

FIG. 1 shows a process flow chart 100 that illustrates one implementation of a method according to the current subject matter. At 102, a communications and control module receives data from a branch circuit monitor module that is installed on a branch circuit. The branch circuit monitor module is installed between a circuit breaker and a power receptacle, and a local power source is connected to the branch circuit at the power receptacle. The data represent one or more of voltage, current, and current flow direction in the branch circuit. At 104, the communications and control module presents control commands to a network interface circuit on the local power source. These control commands cause the local power source to modify its power output such that the branch circuit stays within a safe operating range for the branch circuit. The safe operating range for the branch circuit can be determined based on the maximum rating for current or voltage for a lowest rated component on the branch circuit. If the installation is built to standard building codes, the lowest rated component will typically be a circuit breaker. However, the maximum current or voltage load for the wiring in the branch circuit as well as the maximum current or voltage load for the power receptacle can also be limiting in some examples. The power receptacle can in some examples be a standard, 3-prong 110-120 V AC grounded power outlet such as in widespread use through North America. Alternatively, the power receptacle can be a 220 V AC power outlet.

In a further implementations of the current subject matter, a method can also optionally include a start-up sequence that is shown in dashed boxes in FIG. 1. At 106, the communications and control module can detect that the system has powered on. If the power source is, for example, solar panels with a solar inverter, a power-on event can occur each morning once the solar panels are exposed to solar radiation and begin to supply DC power to the inverter. At 110, the communications and control module establishes communication links with the branch circuit monitor and the inverter(s). The inverters can be maintained in an idle state until communications are established. At 112, once communications links are established, the communications and control module can complete the power circuit to provide electrical power from the power source to the branch circuit. In an optional variation, once the power circuit is completed, the inverter can wait to begin supplying power to the branch circuit until is receives and recognizes the AC waveform on the branch circuit. In this manner, the inverter can properly match the AC waveform for the building so that power supply to the building wiring can proceed.

Figure 2:
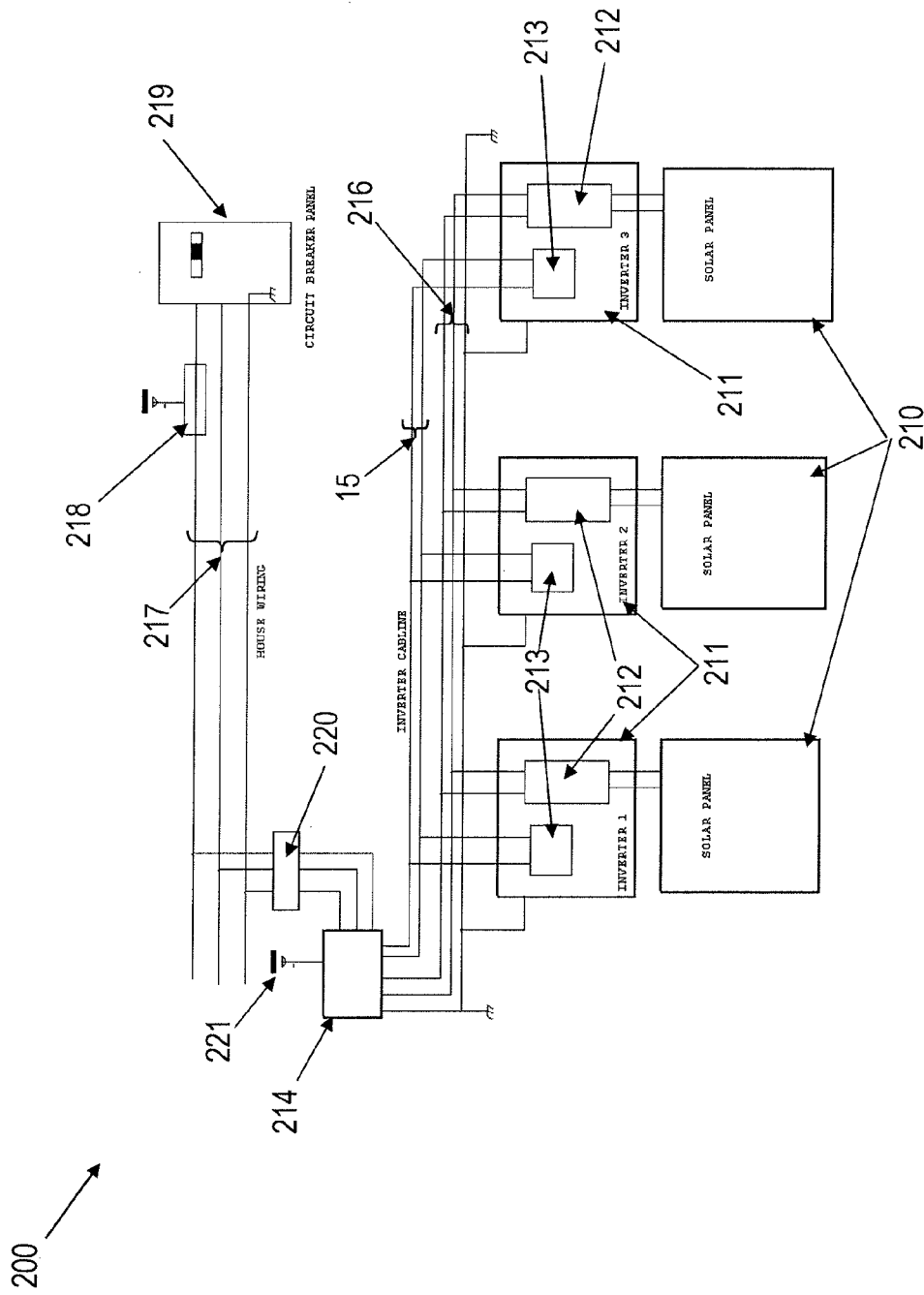
FIG. 2 is a diagram illustrating a system for connecting power sources to an installed wiring system.

FIG. 2 is a schematic diagram showing solar panels 210, solar inverters 211 that each include DC-to-AC circuits 212 and network interface circuits 213, a communications and control module 214, network cables 215 that carry signals between the network interface circuits 213 and the communications and control module 214, electrical power wires 216 that carry AC power from the DC-to-AC circuits 212 to the communications and control module 214, branch circuit wiring 217 that is part of the permanent wiring at a power source installation site, a branch circuit monitor module 218, a circuit breaker box or panel 219, and an AC receptacle 220 connected to the branch circuit wiring 217 according to one implementation of the current subject matter.

FIG. 2 shows solar panels 210 connected to respective solar inverters 211. Within each solar inverter 211, the DC-to-AC circuits 212 convert direct current from the solar panels 210 to alternating current. The inverters 211 also include network interface circuits 213 that connect to differential two-wire network cables 215. An inverter 211 according to the current subject matter converts DC voltage from a local power AC voltage that can provide energy to a utility grid or augment the grid energy delivered to loads on a branch circuit (a building circuit breaker panel). When two or more inverters are used, their outputs may be connected in parallel with a single bus cable or a daisy-chained connection of AC cables. The combined output of all of the solar panels' inverters connected together can be fed to the building wiring on a single connector. The electrical power wiring 216 carries AC current converted by the DC-to-AC circuits 212 from DC power supplied by the solar panels 211. The electrical power wiring 216 and network cables 15 can be integrated within the same cable assembly. The communications and control module 214 as shown in FIG. 2 includes a wireless antenna 221 as a communications interface. Other communications interfaces can be included as well or instead. The output voltage generated by the DC-to-Ac circuits 212 of the inverters 211 is transmitted through the electrical power wiring 216 to the communications and control module 214 and on to a branch circuit 217 of the permanent wiring installation via the AC receptacle 220.

Also shown in FIG. 2 is a branch circuit monitor module 218 that senses the current flow in the hot lead of the branch circuit 217 and determines both the current magnitude and the direction of flow. A branch circuit monitor 218 according to the current subject matter can be located at or near the terminus of a branch circuit 217 to monitor the magnitude and direction of AC current flow (from the grid or into the grid). The branch circuit monitor 218 can monitor the current by determining the magnitude and flow direction of the AC current flowing from the utility grid and the AC current derived from the inverters attached to the branch circuit. Current flows from the utility grid to loads on the branch circuit 217 when the augmented power from the inverters 211 is insufficient to power those loads alone or in the opposite direction if the AC power generated by the inverters 211 exceeds the other electrical loads on the branch circuit 217. A branch circuit monitor module 218 according to the current subject matter can in some examples be a "clamshell" device that is installed by attaching the branch circuit monitor to the exterior insulation of the hot lead of a branch circuit 217 without requiring disconnection of the circuit. In other examples, a branch circuit monitor module 218 can include leads or connections for installing the branch circuit monitor module 218 in series with the branch circuit 217 such that current flows through the branch circuit monitor module 218 between an AC receptacle and a circuit breaker 221. In still other examples, the branch circuit monitor module 218 can be integrated into a circuit breaker 219 as an additional circuit or circuits.

Current measurement and flow direction data are sent from the branch circuit monitor module 218 to the communications and control module 214 which sends the data to the inverters through the differential network cables 215. The inverters 211 can communicate between themselves through the network cables 215 to establish internal tables of data describing each power source's contribution to the total power flowing in the branch circuit 217. The control algorithm within each inverter 211 can be capable of adjusting its power output to optimize the power delivered to the load or to the utility grid while keeping the current on the branch circuit 217 under the maximum rating of the wiring, fuses, and other equipment that constitute the branch circuit 217. The communications and control module 214 can in some implementations have two methods of communication. The first method of communication with the branch circuit monitor 218 can be through any one of a number of different methods such as RS232 direct wire, wireless, RF, communications over the power lines, wired ethernet or other low cost high speed connection. The second method of communication can be through the two-wire data cable network, 215 such as a differential network such as CAN® with high noise immunity. The communications and control module 214 can relay data and commands between the inverters 211 and the branch circuit monitor 218. Additionally, the communications and control module 214 can also incorporate important fault detection and correction functions such as ground fault circuit interruption (GFCI), branch circuit wiring overload detection, unreliable network communication, and faulty inverter operation.

In some implementations, failure of communications between the inverters 211, the communication and control module 214 and/or the branch circuit monitor module 217 can trigger one or more shutdown operations. If an inverter 211 is unable to communicate with any other inverter 211 over the network cables 215, the waveform output of the uncommunicative inverter 211 can be disabled, and the inverter 211 may continue to attempt to communicate with other inverters 211. If an inverter 211 is unable to communicate with the communications and control module 214, that inverter 211 can send a failure to communicate message to other inverters 211 on the network and disable its waveform output. If the branch circuit monitor module 218 is unable to communicate with the communications and control module 214, the system can attempt to communicate over all enabled interfaces. If that fails, then the communications and control module may broadcast messages to the inverters to disconnect. If the communications and control module 214 is unable to communicate with any inverters 211, it can in some implementations terminate or otherwise disconnect the flow of AC power from the inverters 211 to the branch circuit 217.

Systems according to the current subject matter can monitor the total current flowing in the branch circuit 217 wiring and limit that current to safe operating ranges so as to not exceed the rating of the branch circuit wires. The conversion of DC (e.g. from solar panels) to AC can in some implementations be accomplished with a single inverter 211 with sufficient power rating to accommodate the power output of installed solar panels or with multiple inverters. For instance, a module panel inverter may have one inverter attached to each solar panel. Though most industry standard inverters output 240 VAC, building receptacles are usually 120 VAC rated. One implementation of the current subject matter delivers 120 VAC to appeal to the widest market available. An alternate 240 VAC version can also be used with a suitable 240 VAC rated receptacle and branch circuit. The connector from the communications and control module 214 to the power receptacle 220 can optionally include a connection to the power receptacle that requires the use of a tool, such as for example a screwdriver or wrench, for installation or removal. The connector can also include a feature that prevents the connection terminals from being exposed when the connector is detached from the power receptacle 220.

If module panel inverters are used, then an interconnect system may in some examples be needed to parallel connect the AC output voltage from each inverter 211 and the two-wire differential data cable network 215. One cable could contain both wire bundles (AC and network wires). In one embodiment, a single connector in each inverter 211 could attach to a cable or system of cables to enable paralleling of the AC and network data cables 215 in such a way as to allow a snap fit of connectors together without the use of tools. A branch circuit monitor module 218 can derive operating power inductively from a branch circuit 217 to which it is attached and monitoring. The branch circuit monitor module 218 can measure the current in the branch circuit 217 and observing the current waveform, and can use the voltage and current waveforms to measure the power factor or phase relationship of the voltage and current to more precisely determine the real power and apparent power. Branch circuit monitor modules 218 can be discrete devices attached to individual branch circuits 217 and can be located at or near the branch circuit's wiring termination, for example near the circuit breaker 221 in the circuit breaker panel 219 or box. If the branch circuit monitor module 218 is, as described below, a circuit breaker module that replaces the branch circuit's original circuit breaker, then the branch circuit monitor module 218 may be located at the terminus by installing the circuit breaker into the circuit breaker panel. A branch circuit monitor module 218 can have one or more communications interfaces available for communicating with a communications and control module 214. In the case of a wireless RF interface, the branch circuit monitor module 218 can have a RF antenna. For other interfaces, connectors may be available.

The communications and control module 214 may have a communications interface matching a branch circuit monitor module 218. However, each of those devices can have more than one communications interface to choose from. The communications and control module 214 can be powered from the branch circuit and may connect to the two-wire differential data cable network 215 to which all the inverters 211 can be attached. One implementation of the communications and control module 214 could include a three-pronged plug that connects the inverter 211 AC wiring to the building branch circuit 217 AC receptacle 220 and a circuit breaker 221 rated for the branch circuit 217 wire size. In this instance, the inverter AC wiring connector could plug into the communications and control module 214, which could then be plugged into the AC receptacle 220. A GFCI circuit could then isolate the inverters 211 from the branch circuit 217 in the event of a ground fault.

An alternative to using a separate communications and control module 214 for communicating with a branch circuit monitor module 218 is to use a master inverter 310 that has a communications interface to the branch circuit monitor module 218. A master inverter 310 may differ from other inverters 211 in a number of ways. For instance, the master inverter's 310 output connector can be a three-pronged plug that is directly connectable to a standard AC power outlet 220. The master inverter 310 can also include a GFCI circuit as an internal part of the inverter. It could also have a master cutoff switch. The master inverter 310 can be the last inverter in a chain of slave inverters and can be positioned closest to a branch circuit AC receptacle 220. Also, the communications and control functions of a communications and control module 214 may be incorporated into the circuits and software of the master inverter 310. The master inverter 310 in such a configuration can act as the communications and control module for the other inverters 211. Network cabling and/or electrical power wiring can connect the other inverters 211 to the master inverter 310. FIG. 3 through FIG. 8 depict possible variations in implementing one or more branch circuit monitor modules 218 and method of communications between a branch circuit monitor modules and a communications and control module 214. In the examples illustrated in FIG. 3 to FIG. 8, the inverter 211 can be a master inverter 310 as discussed above which can incorporate the functions of a communications and control module 214 rather than having a separate module for that purpose. In other variations, the communications and control module 214 and inverter 211 can be housed in separate devices as shown in FIG. 2.

Figure 3:
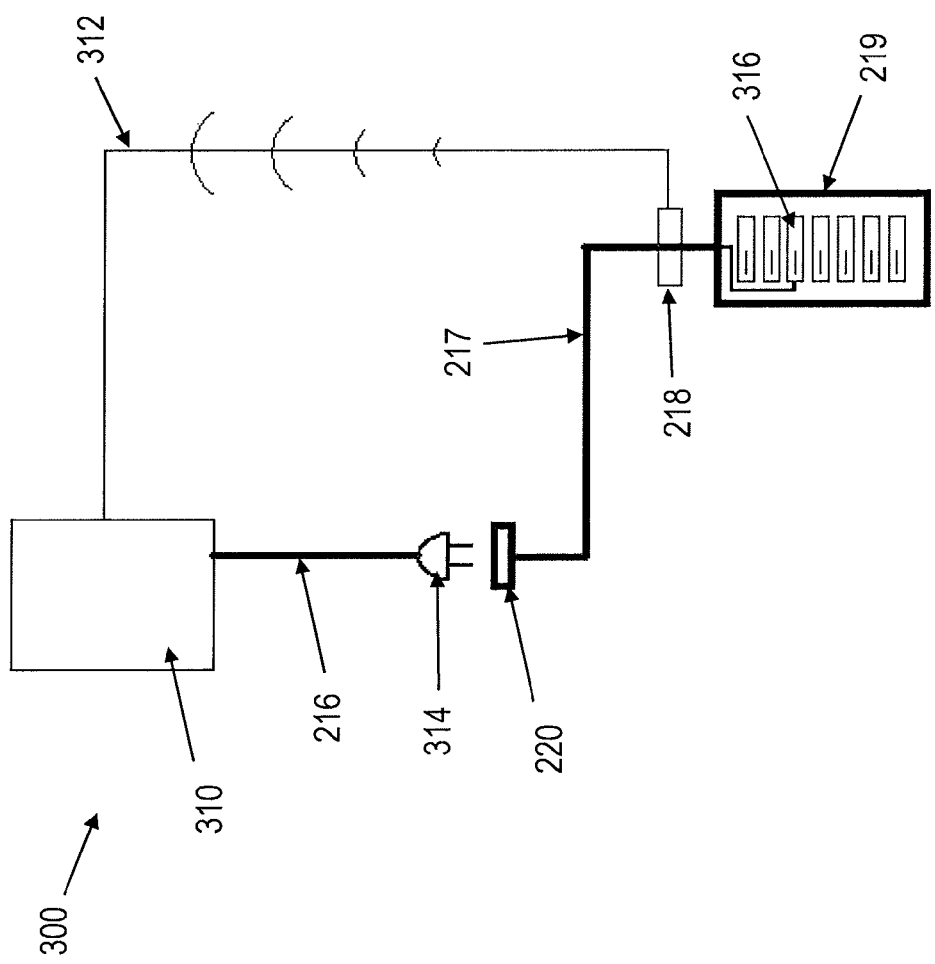
FIG. 3 is a diagram showing a second example of a system for connecting power sources to an installed wiring system.

FIG. 3 is a diagram showing a system 300 that includes a master inverter 310, electrical power wiring 216 connecting the inverter AC output to a branch circuit 217 and a circuit breaker panel 219, a branch circuit monitor module 218, and a wired communications path 312 from the branch circuit monitor module 218 to the master inverter 310. An electrical power wire 216 can connect the master inverter 310 to the branch circuit 217 via a standard AC plug 314 that connects to an AC receptacle 220. The branch circuit 217 connects to a circuit breaker 316 in the circuit breaker panel 219. Located adjacent to the breaker panel 219, a branch circuit monitor module 218 measures one or more of the AC voltage, AC current, and AC current flow direction of the branch circuit 217, and transmits the measured data over the wired communication path 312 that can in some examples be a RS232 or RS485 link, to the master inverter 310.

Figure 4:
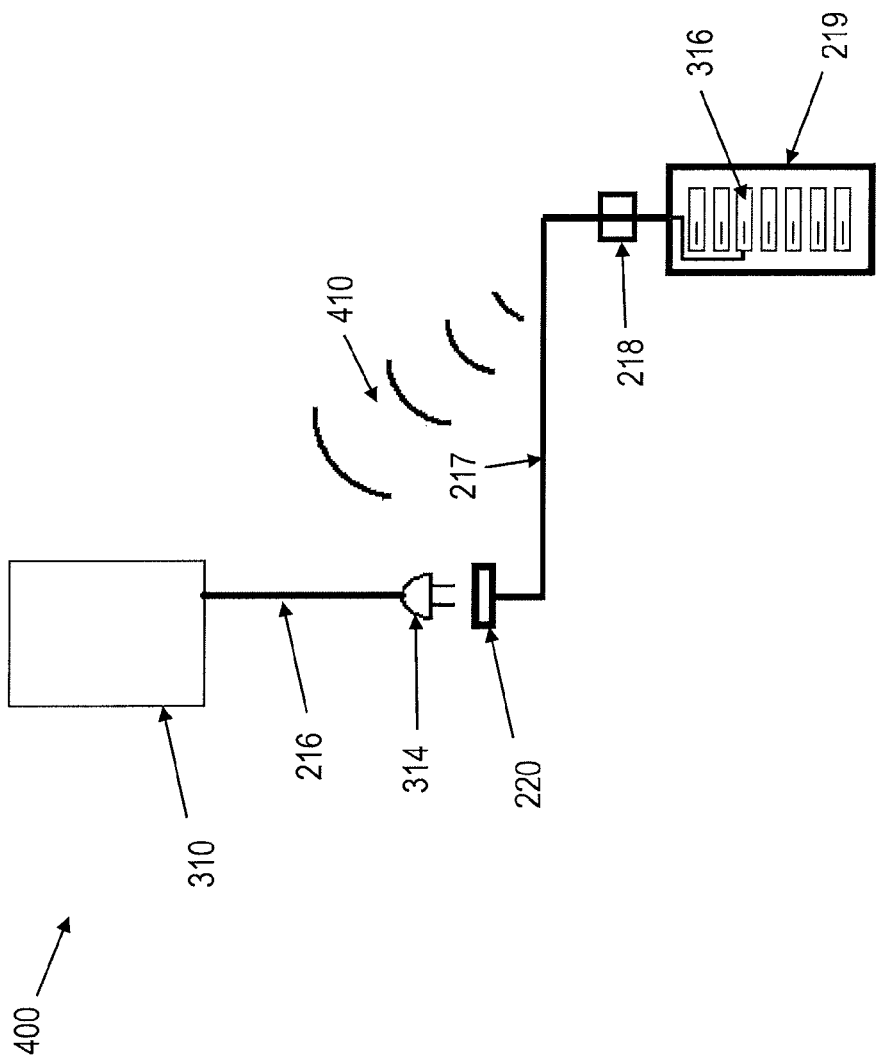
FIG. 4 is a diagram showing a third example of a system for connecting power sources to an installed wiring system.

FIG. 4 is a diagram showing a system 400 that features wireless data transmission. The system 400 includes a master inverter 310, electrical power wiring 216 connecting the inverter AC output to a branch circuit 217 and a circuit breaker panel 219, a branch circuit monitor module 218, and a wireless communications path 410 from the branch circuit monitor module 218 to the master inverter 310. An electrical power wire 216 can connect the master inverter 310 to the branch circuit 217 via a standard AC plug 314 that connects to an AC receptacle 220. The branch circuit 217 connects to a circuit breaker 316 in the circuit breaker panel 219. Located adjacent to the breaker panel 219, a branch circuit monitor module 218 measures one or more of the AC voltage, AC current, and AC current flow direction of the branch circuit 217, and transmits the measured data over the wireless communication path 410 to the master inverter 310, which can also contain a wireless transceiver 412.

Figure 5:
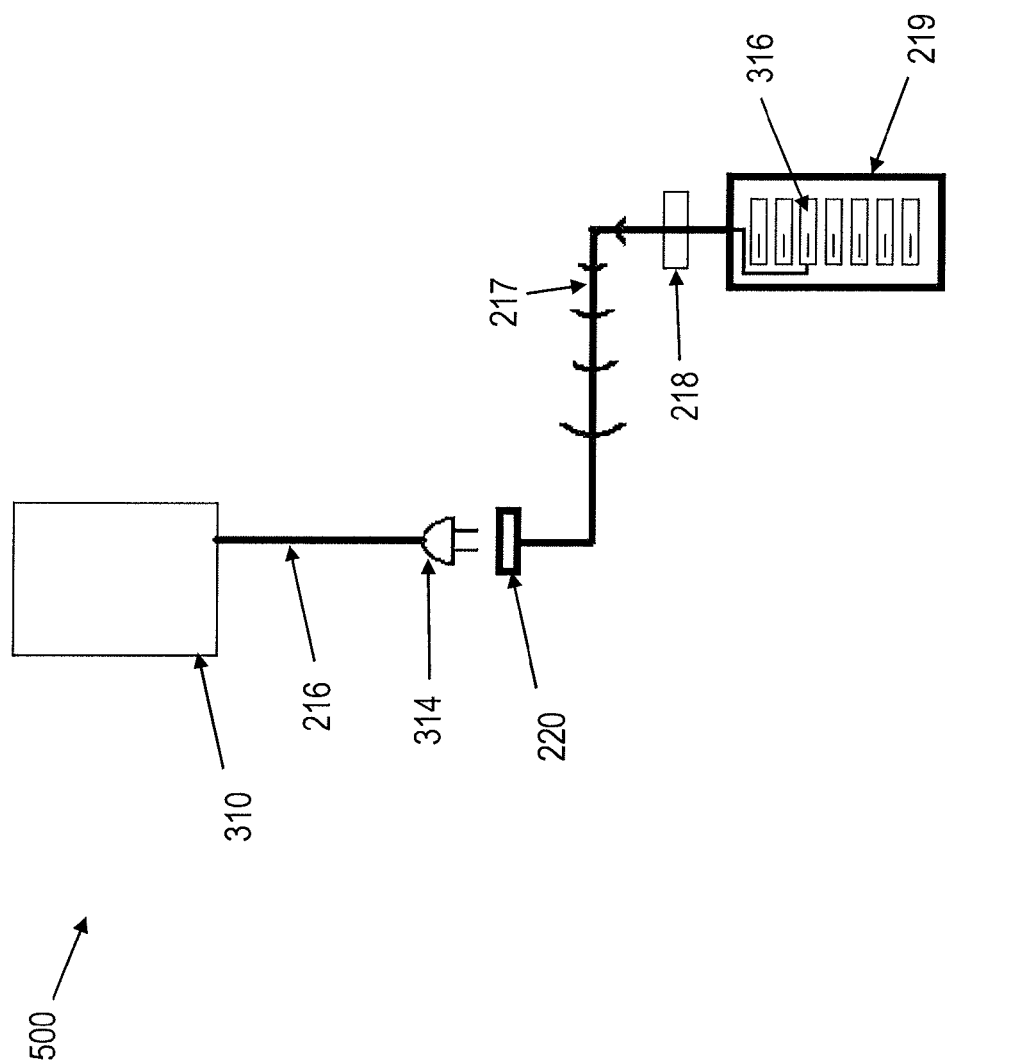
FIG. 5 is a diagram showing a fourth example of a system for connecting power sources to an installed wiring system.

FIG. 5 is a diagram showing a system 500 in which data exchange occurs via a communication over power lines protocol. The system 500 includes a master inverter 310, electrical power wiring 216 connecting the inverter AC output to a branch circuit 217 and a circuit breaker panel 219, a branch circuit monitor module 218, and a communications path from the branch circuit monitor 218 to the master inverter 310 that uses the wiring of the branch circuit 217 and the electrical power wiring 216. An electrical power wire 216 can connect the master inverter 310 to the branch circuit 217 via a standard AC plug 314 that connects to an AC receptacle 220. The branch circuit 217 connects to a circuit breaker 316 in the circuit breaker panel 219. Located adjacent to the breaker panel 219, a branch circuit monitor module 218 measures one or more of the AC voltage, AC current, and AC current flow direction of the branch circuit 217, and transmits the measured data over the branch circuit wiring 217 and the electrical power cable 216 via the communications over power lines protocol.

Figure 6:
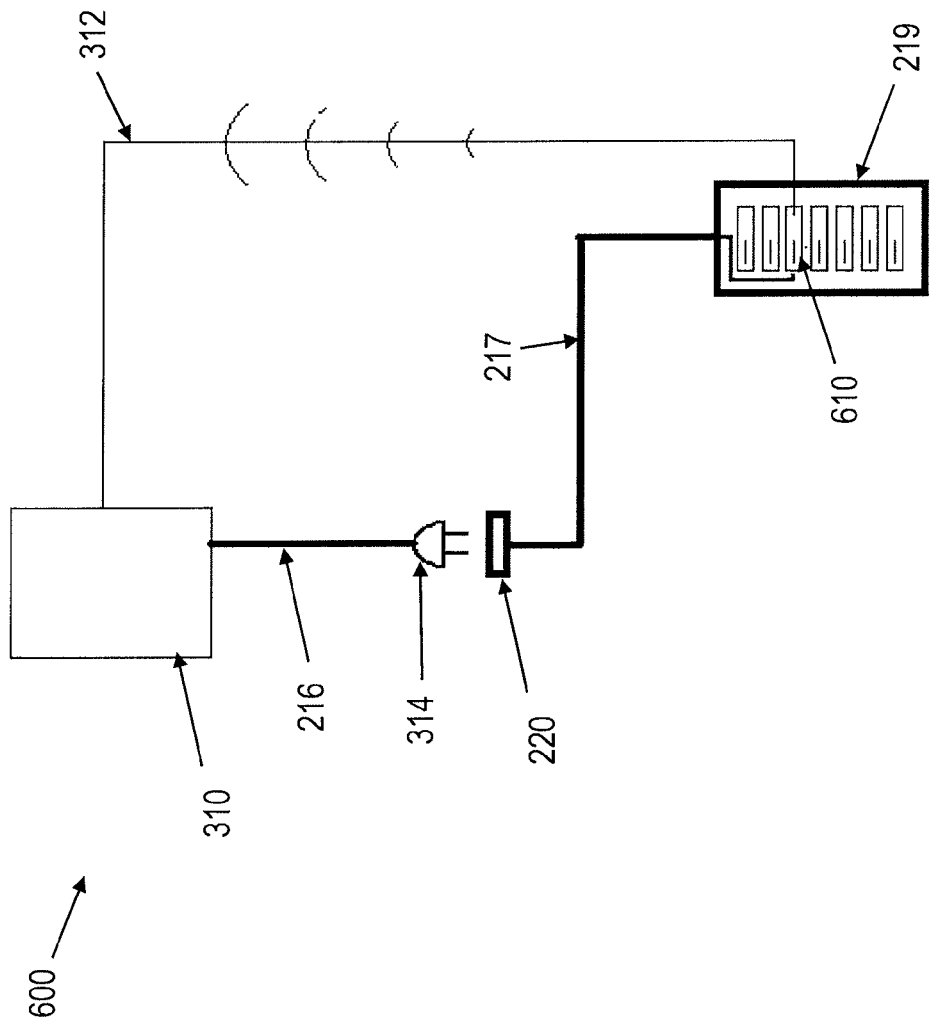
FIG. 6 is a diagram showing a fifth example of a system for connecting power sources to an installed wiring system.

FIG. 6 is a diagram showing a system 600 in which functionality of a branch circuit monitor module is incorporated into an intelligent circuit breaker. The system 600 includes a master inverter 310, electrical power wiring 216 connecting the inverter AC output to a branch circuit 217 and an intelligent circuit breaker 610 containing branch circuit monitor module circuitry that is installed in a circuit breaker panel 219, and a wired communications path 312 from the intelligent circuit breaker 610 to the master inverter 310. An electrical power wire 216 can connect the master inverter 310 to the branch circuit 217 via a standard AC plug 314 that connects to an AC receptacle 220. The branch circuit 217 connects to the intelligent circuit breaker 610 in the circuit breaker panel 219. The branch circuit monitor module circuitry of the intelligent circuit breaker 610 measures one or more of the AC voltage, AC current, and AC current flow direction of the branch circuit 217, and transmits the measured data over the wired communications path 312 to the master inverter 310.

Figure 7:
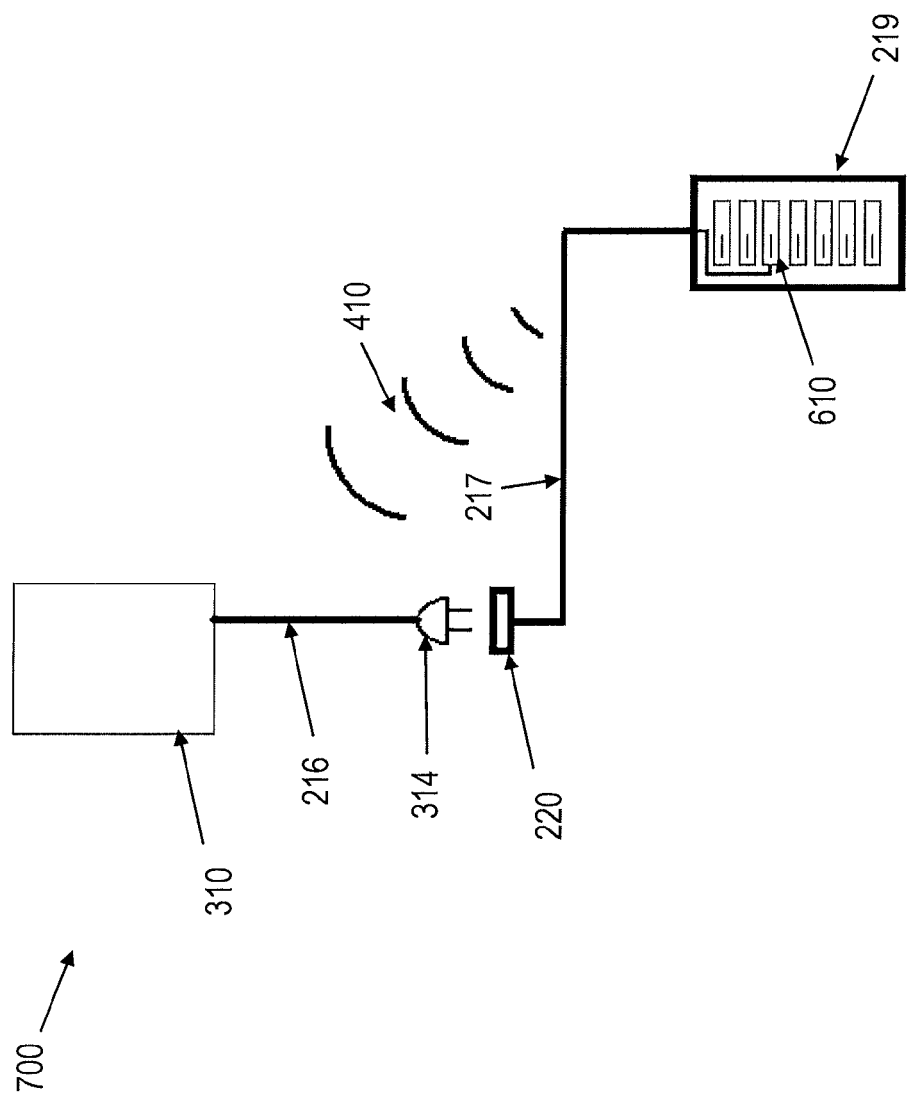
FIG. 7 is a diagram showing a sixth example of a system for connecting power sources to an installed wiring system.

FIG. 7 is a diagram showing a system 700 in which functionality of a branch circuit monitor module is incorporated into an intelligent circuit breaker. The system 700 includes a master inverter 310, electrical power wiring 216 connecting the inverter AC output to a branch circuit 217 and an intelligent circuit breaker 610 containing branch circuit monitor module circuitry that is installed in a circuit breaker panel 219, and a wireless communications path 410 from the intelligent circuit breaker 610 to the master inverter 310. An electrical power wire 216 can connect the master inverter 310 to the branch circuit 217 via a standard AC plug 314 that connects to an AC receptacle 220. The branch circuit 217 connects to the intelligent circuit breaker 610 in the circuit breaker panel 219. The branch circuit monitor module circuitry of the intelligent circuit breaker 610 measures one or more of the AC voltage, AC current, and AC current flow direction of the branch circuit 217, and a wireless transceiver circuit or module on the intelligent circuit breaker 610 transmits the measured data over the wireless communications path 410 to the master inverter 310 which can also include a wireless transceiver 412.

Figure 8:
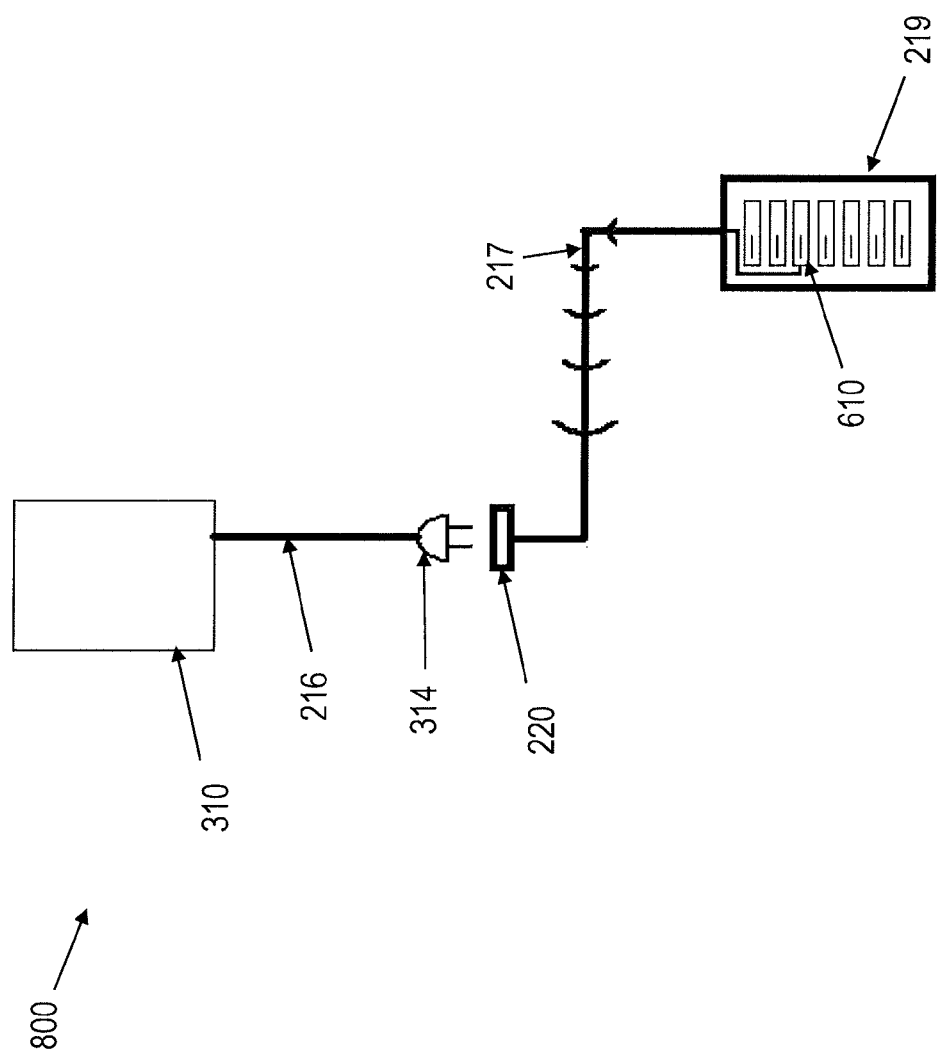
FIG. 8 is a diagram showing a seventh example of a system for connecting power sources to an installed wiring system.

FIG. 8 is a diagram showing a system 800 in which functionality of a branch circuit monitor module is incorporated into an intelligent circuit breaker and data exchange occurs via a communication over power lines protocol. The system 800 includes a master inverter 310, and electrical power wiring 216 connecting the inverter AC output to a branch circuit 217 and to an intelligent circuit breaker 610 containing branch circuit monitor module circuitry that is installed in a circuit breaker panel 219. An electrical power wire 216 can connect the master inverter 310 to the branch circuit 217 via a standard AC plug 314 that connects to an AC receptacle 220. The branch circuit 217 connects to the intelligent circuit breaker 610 in the circuit breaker panel 219. The branch circuit monitor module circuitry of the intelligent circuit breaker 610 measures one or more of the AC voltage, AC current, and AC current flow direction of the branch circuit 217, and transmits the measured data over the branch circuit wiring 217 and the electrical power cable 216 via the communications over power lines protocol.

Some implementations of the subject matter described herein may be embodied in systems, apparatus, methods, and/or articles depending on the desired configuration. In particular, various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flow depicted in the accompanying figures and/or described herein do not require the particular order shown, or sequential order, to achieve desirable results. Other embodiments may be within the scope of the following claims.

What is claimed:

1. A system comprising:
    a branch circuit monitor module configured to be installed as part of a branch circuit, the branch circuit comprising a circuit breaker and a power receptacle and having safe operating ranges for current and voltage carried by the branch circuit, the branch circuit monitor module measuring data representative of one or more of voltage, current, and current flow direction in the branch circuit between the circuit breaker and the power receptacle and outputting the data; and
    a communications and control module that receives the data and, in response, presents control commands to a local power source, the control commands causing the local power source to modify its power output such that the branch circuit stays within the safe operating ranges.

2. The system as in claim 1, further comprising a network interface circuit for installation in the local power source, the network interface circuit receiving and implementing the control commands.

3. The system as in claim 2, further comprising network cables to carry signals between the network interface circuit and the communications and control module.

4. The system as in claim 2, wherein the branch circuit monitor module further comprises a first wireless transceiver via which it outputs the data, and the communications and control module further comprises a second wireless transceiver via which it receives the data.

5. The system as in claim 2, wherein the branch circuit monitor module outputs the data over the branch circuit using a communications over power lines protocol.

6. The system as in claim 1, further comprising a master inverter that comprises the communications and control module and that further comprises a DC-to-AC circuit that converts DC power received by the master inverter to AC power output by the master inverter.

7. The system as in claim 1, wherein the branch circuit monitor module comprises a clamshell device that is installed over an exterior insulation of a hot lead of the branch circuit without requiring disconnection of the branch circuit.

8. The system as in claim 1, wherein the circuit breaker comprises an intelligent circuit breaker that comprises the branch circuit monitor module.

9. The system as in claim 1, wherein the local power source comprises a solar panel that provides DC electrical power to an inverter that converts the DC electrical power to AC electrical power.

10. The system as in claim 1, wherein the communications and control module receives an output of alternating current electrical power from the local power source via an electrical wire, the system further comprising an electrical connector that carries electrical power from the communications and control module to the branch circuit, the connector comprising a plug that is compatible with and that plugs in to the power receptacle and a connection to the power receptacle that requires a tool to attach and detach.

11. The system as in claim 10, wherein the local power source comprises a solar panel that provides DC electrical power to an inverter that converts the DC electrical power to the output of alternating current electrical power.

12. The system as in claim 11, wherein the connector comprises a plug that is compatible with and that plugs in to the power receptacle and a connection to the power receptacle that requires a tool to attach and detach.

13. The system as in claim 10, further comprising an electrical connector that carries electrical power from the communications and control module to the branch circuit.

14. A system comprising:
    a branch circuit comprising a circuit breaker and a power receptacle and having safe operating ranges for current and voltage carried by the branch circuit;
    a branch circuit monitor module installed on the branch circuit, the branch circuit monitor module measuring data representative of one or more of voltage, current, and current flow direction in the branch circuit between the circuit breaker and the power receptacle and outputting the data;
    a local power source comprising a network interface circuit and generating an output of alternating current electrical power; and
    a communications and control module that receives the data and the output of alternating current electrical power, the communications and control module presenting control commands to the network interface circuit in response to the data, the control commands causing the local power source to modify its power output such that the branch circuit stays within the safe operating ranges.

15. A system comprising:
    a solar panel that produces direct current electrical power when exposed to solar radiation;
    a solar inverter that receives the direct current electrical power, the solar inverter comprising a DC-to-AC circuit that converts the direct current electrical power to alternating current electrical power, and further comprising a network interface circuit;

a branch circuit monitor module that installs on a branch circuit of a building electrical system, the branch circuit comprising a circuit breaker and a power receptacle and having safe operating ranges for current and voltage carried by the branch circuit, the branch circuit monitor module measuring data representative of one or more of voltage, current, and current flow direction in the branch circuit between the circuit breaker and the power receptacle and outputting the data; and a communications and control module that receives the data and also receives the alternating current electrical power from the solar inverter via an electrical wire, the communications and control module also comprising an electrical connector that connects to the power receptacle of the branch circuit, the communications and control module presenting control commands to the network interface circuit in response to the data, the control commands causing the local power source to modify its power output such that the branch circuit stays within the safe operating ranges.

16. A method comprising:

receiving data at a communications and control module from a branch circuit monitor module installed on a branch circuit that comprises a circuit breaker and a power receptacle, the data representing one or more of voltage, current, and current flow direction in the branch circuit, a local power source being connected to the branch circuit at the power receptacle; and presenting control commands to a network interface circuit on the local power source in response to the data, the control commands causing the local power source to modify its power output such that the branch circuit stays within a safe operating range for the branch circuit.

17. The method as in claim 16, further comprising:

detecting, at the communications and control module, that the local power source is ready to supply electrical power;

establishing communications links between the communications and control module and the branch circuit monitor module and the local power source; and completing a power circuit in the communications and control module to connect the local power source to the branch circuit.

18. The method as in claim 16, wherein the circuit breaker comprises the branch circuit monitor module.

19. A method comprising:

detecting, at a communications and control module, that a local power source is ready to supply electrical power, the electrical power source being connected to the communications and control module by an electrical wire, the communications and control module being connected to a branch circuit of a building at a power receptacle on the branch circuit, the branch circuit comprising the power receptacle and a circuit breaker in a breaker panel;

establishing a first communications link between the communications and control module and a branch circuit monitor module that is installed on the branch circuit;

establishing a second communications link between the communications and control module and the local power source; and completing a power circuit in the communications and control module to connect the local power source to the branch circuit, the completing occurring after the first and the second communications links are established.

20. The method as in claim 19, wherein the local power source comprises a network interface circuit that forms the second communications link with the communications and control module.

\* \* \* \* \*

UNITED STATES PATENT AND TRADEMARK OFFICE
CERTIFICATE OF CORRECTION

PATENT NO.        : 8,106,765 B1
APPLICATION NO.   : 12/332308
DATED             : January 31, 2012
INVENTOR(S)       : Andrew Buck-Ackerson and George Lee Ackerson It is certified that error appears in the above-identified patent and that said Letters Patent is hereby corrected as shown below:

Title page, item [76] inventors: should read as follows:

Andrew Buck-Ackerson, Ben Lomond, CA (US): George Lee Ackerson, Ben Lomond, CA (US)

Signed and Sealed this
Eighth Day of May, 2012

David J. Kappos
*Director of the United States Patent and Trademark Office*